(12) United States Patent
Lee

(10) Patent No.: US 9,001,107 B2
(45) Date of Patent: Apr. 7, 2015

(54) IMAGE PIXEL AND IMAGE PIXEL CONTROL METHOD

(75) Inventor: Woong Hee Lee, Icheon Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 230 days.

(21) Appl. No.: 13/542,980

(22) Filed: Jul. 6, 2012

(65) Prior Publication Data
US 2013/0016088 A1    Jan. 17, 2013

(30) Foreign Application Priority Data
Jul. 14, 2011  (KR) .................. 10-2011-0069900

(51) Int. Cl.
G09G 5/00  (2006.01)
H04N 5/235  (2006.01)

(52) U.S. Cl.
CPC ..................................... *H04N 5/235* (2013.01)

(58) Field of Classification Search
CPC .......... G09G 3/001; G09G 2320/0626; G09G 2360/144
USPC ......... 345/205–212, 690; 358/1.16, 474, 482, 358/483, 513; 348/308, 241; 250/208.1
See application file for complete search history.

(56) References Cited

U.S. PATENT DOCUMENTS

| | | | | |
|---|---|---|---|---|
| 5,489,993 | A * | 2/1996 | Ito et al. .................... | 358/482 |
| 6,934,050 | B2 * | 8/2005 | Merrill et al. ............... | 358/1.16 |
| 7,705,379 | B2 * | 4/2010 | Adachi ...................... | 257/292 |
| 8,049,743 | B2 * | 11/2011 | Kang .......................... | 345/207 |
| 8,259,838 | B2 * | 9/2012 | Tanimoto et al. ............. | 375/279 |
| 2006/0157759 | A1 | 7/2006 | Okita et al. | |
| 2007/0290238 | A1 * | 12/2007 | Adachi ........................ | 257/288 |
| 2008/0180464 | A1 * | 7/2008 | Kang ............................ | 345/690 |
| 2008/0252742 | A1 | 10/2008 | Oike | |
| 2008/0258044 | A1 * | 10/2008 | Schrey et al. ................ | 250/208.1 |
| 2009/0090845 | A1 * | 4/2009 | Yin et al. .................... | 250/208.1 |
| 2009/0219266 | A1 * | 9/2009 | Lim et al. ..................... | 345/205 |
| 2009/0295973 | A1 * | 12/2009 | Oshikubo et al. ............. | 348/311 |
| 2010/0053392 | A1 * | 3/2010 | Sawada et al. ................ | 348/294 |
| 2010/0134667 | A1 * | 6/2010 | Suzuki et al. ................. | 348/294 |
| 2010/0141812 | A1 * | 6/2010 | Hirota ........................... | 348/279 |

(Continued)

FOREIGN PATENT DOCUMENTS

JP     2006197382 A     7/2006
KR    1020080092862 A   10/2008

OTHER PUBLICATIONS

Arthur Spivak et al., Wide-Dynamic-Range CMOS Image Sensors—Comparative Performance Analysis, IEEE Transactions on Electron Devices, Nov. 2009, pp. 2446-2461, vol. 56, No. 11.

*Primary Examiner* — Prabodh M Dharia
(74) *Attorney, Agent, or Firm* — William Park & Associates Patent Ltd.

(57) ABSTRACT

An image pixel control method includes: performing an initialization process comprising initializing the light receiving unit; performing an excess value sampling process comprising sampling a voltage level corresponding to a quantity of photoelectrons in excess of a photoelectron accommodation capacity of the light receiving unit; performing an initialization level comprising sampling process sampling a voltage level applied to the light receiving unit when the light receiving unit is initialized; and performing a data level sampling process comprising sampling a voltage level corresponding to a quantity of photoelectrons accommodated in the light receiving unit.

15 Claims, 9 Drawing Sheets

(56) References Cited

U.S. PATENT DOCUMENTS

| | | |
|---|---|---|
| 2010/0182470 A1* | 7/2010 | Sugawa et al. ............... 348/294 |
| 2010/0230579 A1* | 9/2010 | Watanabe ................. 250/208.1 |
| 2011/0042551 A1* | 2/2011 | Ha ............................ 250/208.1 |
| 2011/0085066 A1* | 4/2011 | Sugawa et al. ............... 348/302 |
| 2011/0242381 A1* | 10/2011 | Sakakibara et al. .......... 348/301 |
| 2013/0070141 A1* | 3/2013 | Watanabe .................... 348/302 |
| 2013/0077134 A1* | 3/2013 | Compton et al. ............. 358/482 |
| 2014/0014823 A1* | 1/2014 | Araki et al. ................ 250/208.1 |

* cited by examiner

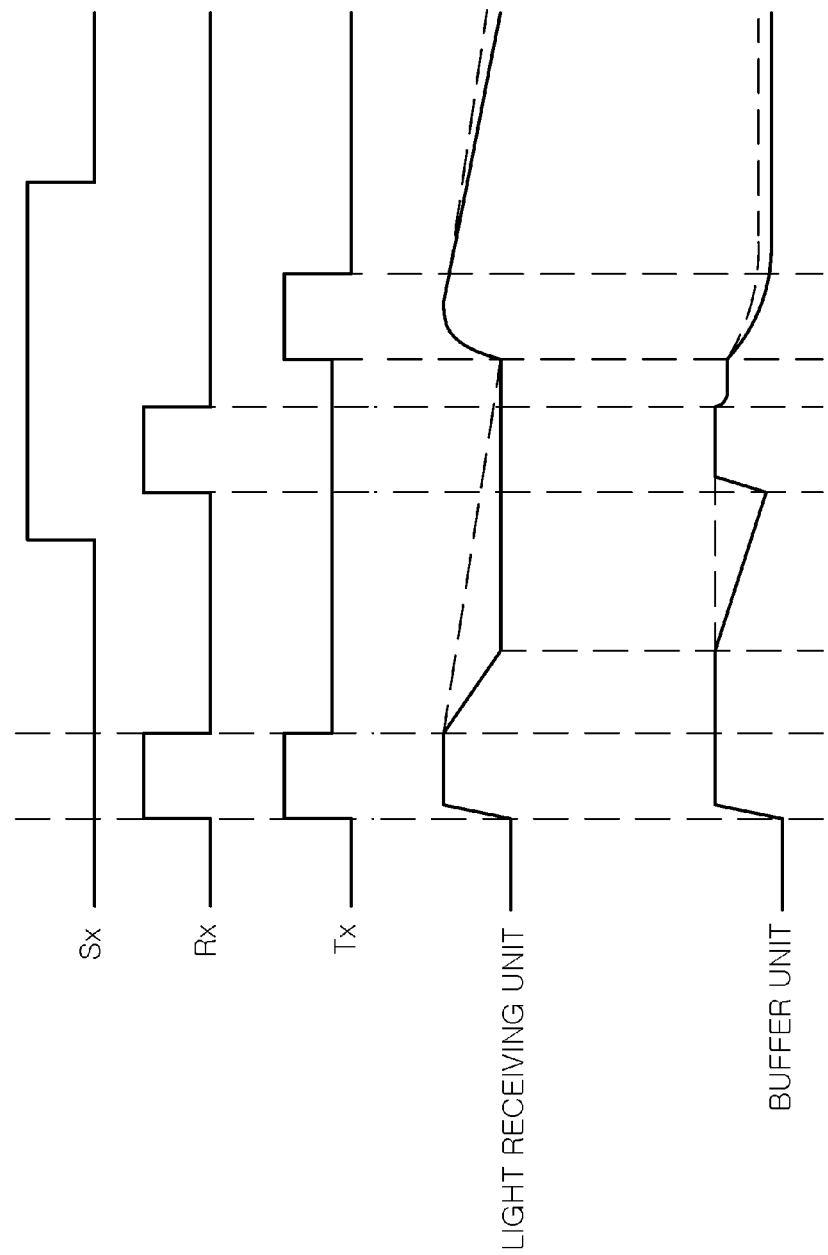

IMAGE PIXEL AND IMAGE PIXEL CONTROL METHOD

CROSS-REFERENCE TO RELATED APPLICATIONS

This application claims priority under 35 U.S.C. §119(a) to Korean Patent Application No. 10-2011-0069900 filed on Jul. 14, 2011, in the Korean Intellectual Property Office, the disclosure of which is incorporated herein by reference in its entirety.

BACKGROUND OF THE INVENTION

1. Field of the Invention

Embodiments of the inventive concept relate generally to image processing, and more specifically to an image pixel apparatus and an image pixel control method.

2. Description of the Related Art

With technological advances of the electronic devices such as digital cameras, cell-phone cameras, optical sensors such as image sensors are improving functionalities in various aspects of their operation. In particular, demand for the enhancement of a dynamic range is increasing.

This is because, as image sensors such as optical sensors are mounted within mobile devices, the image sensors are designed to be compact or highly integrated in order to reduce the size thereof. Therefore, for example, in case of a CMOS image sensor, the size of a photodiode which is a light receiving unit is reduced, which results in a reduction in the quantity of received light, and accordingly, a dynamic range thereof decreases.

In an effort to meet the requirements for the image sensors, a method of using multi-exposure, a method of using logarithmic response, and the like, were proposed by Arthur Spivak, Alexander Belenky, Alexander Fish, and Orly Yadid-Pecht in IEEE Transactions on Electron Devices, Vol. 56, No. 11, November 2009, pp. 2446-2461.

However, the multi-exposure method has a probability in which a difference in a signal to noise ratio (SNR) causes noise in the process synthesizing a plurality of signals each having a different exposure time. In addition, the method of using logarithmic response may have difficulty in processing a digital signal after an analog-to-digital conversion (ADC), in comparison to a linear response.

SUMMARY OF THE INVENTION

One or more embodiments of the inventive concept may provide an image pixel having an enhanced dynamic range and a method for providing control to enhance a dynamic range of an image pixel.

According to an aspect of the inventive concept, there is provided an image pixel control method for controlling an image pixel including a light receiving unit that generates and accommodates photocharges upon receiving light, including: an initialization process initializing the light receiving unit; an excess value sampling process sampling a voltage level corresponding to a quantity of photoelectrons in excess of a photoelectron accommodation capacity of the light receiving unit; an initialization level sampling process sampling a voltage level when the light receiving unit is initialized; and a data level sampling process sampling a voltage level corresponding to the quantity of photoelectrons of the light receiving unit.

According to another aspect of the inventive concept, there is provided an image pixel control method for controlling an image pixel including a light receiving unit that generates and accommodates photocharges upon receiving light and a buffer unit that accommodates charges, including: an initialization process connecting the buffer unit and the light receiving unit and applying an initialization voltage level to the buffer unit to initialize the light receiving unit; an excess value sampling process connecting the buffer unit and the light receiving unit by a current path having a pre-set level of conductivity, transferring photoelectrons in excess of a photoelectron accommodation capacity of the light receiving unit to the buffer unit, and sampling a voltage level of the buffer unit; an initialization level sampling process applying the initialization voltage level to the buffer unit and sampling the initialization voltage level; and a data level sampling process connecting the buffer unit and the light receiving unit to distribute the photoelectrons accommodated in the light receiving unit, and sampling a voltage level of the buffer unit.

According to another aspect of the inventive concept, there is provided an image pixel control method for controlling an image pixel including a light receiving unit that generates and accommodates photocharges upon receiving light, a buffer unit that accommodates charges, a Tx transistor connecting the buffer unit and the light receiving unit, and an Rx transistor connecting the buffer unit and a power source providing an initialization voltage, including: an initialization process turning the Rx transistor and the Tx transistor on to connect the buffer unit, the light receiving unit and the power source, and initializing the light receiving unit and the buffer unit with an initialization voltage level; an excess value sampling process turning the Rx transistor off, maintaining a gate voltage of the Tx transistor at a pre-set level to transfer photoelectrons in excess of a photoelectron accommodation capacity of the light receiving unit to the buffer unit, and sampling a voltage level of the buffer unit; an initialization level sampling process turning the Rx transistor on and sampling the voltage level of the buffer unit; and a data level sampling process turning the Rx transistor off, and turning the Tx transistor on to allow the photoelectrons of the light receiving unit to be shared by the buffer unit, and sampling the voltage level of the buffer unit.

According to another aspect of the inventive concept, there is provided an image pixel including: a light receiving unit generating photocharges upon receiving light, and accommodating the generated photocharges; a buffer unit accommodating charges; a Tx transistor connecting the light receiving unit and the buffer unit; an Rx transistor connecting the buffer unit and a power source; an Sx transistor connecting the buffer unit and an external device; and a controller controlling an ON/OFF operation of the respective transistors by adjusting a voltage level applied to the gates of the Tx, Rx, and Sx transistors, wherein the controller turns the Rx transistor and the Tx transistor on to initialize the light receiving unit, applies a pre-set voltage level to the gate of the Tx transistor to transfer photoelectrons in excess of the photoelectron accommodation capacity of the light receiving unit to the buffer unit, turns the Sx transistor on to output voltage level information of the buffer unit to an external device, turns the Rx transistor and the Sx transistor on to output the voltage level information of the buffer unit to the external device, turns the Tx transistor on to allow photoelectrons accommodated in the light receiving unit to be shared by the buffer unit, and turns the Sx transistor on to output the voltage level information of the buffer unit to the external device.

BRIEF DESCRIPTION OF THE DRAWINGS

The above and other aspects, features and other advantages of the inventive concept will be more clearly understood from the following detailed description taken in conjunction with the accompanying drawings, in which:

FIG. 7B is a view showing changes in voltages of respective parts of an image pixel with the lapse of time, when the image pixel control method according to an embodiment of the inventive concept is applied;

DETAILED DESCRIPTION OF THE PREFERRED EMBODIMENT

Figure 1:
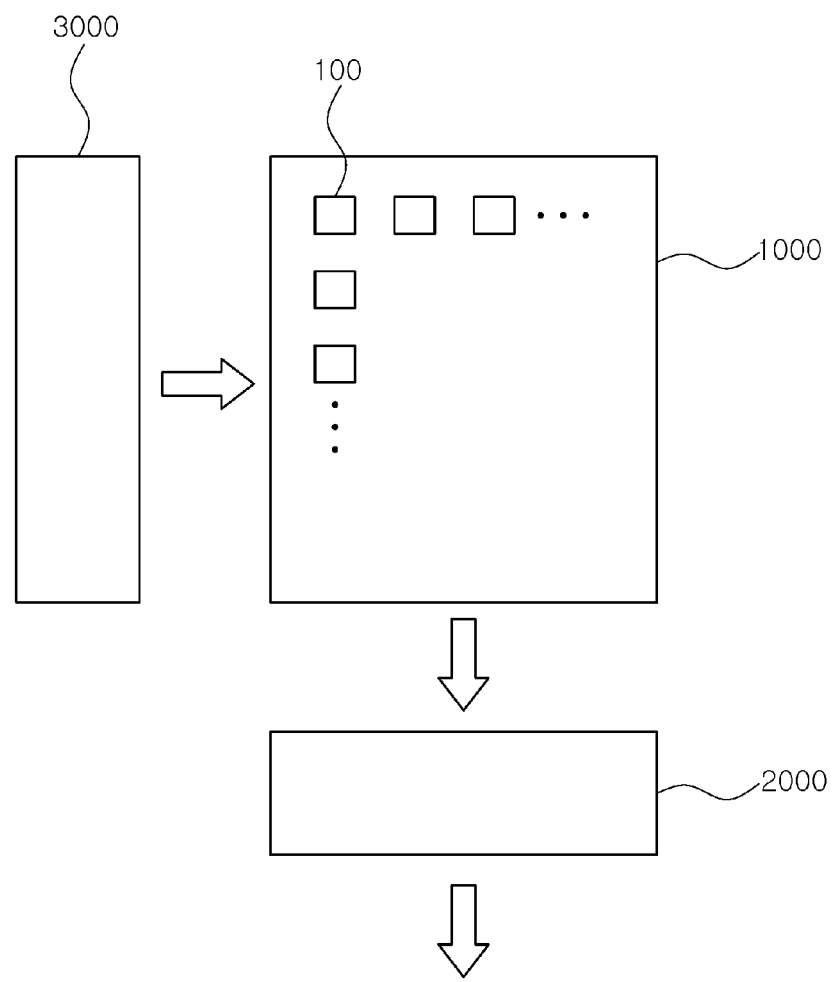
FIG. 1 is a schematic view showing the configuration of a known image sensor.

Embodiments of the inventive concept will now be described in detail with reference to the accompanying drawings. The embodiments may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

FIG. 1 is a schematic view showing the configuration of a known image sensor.

With reference to FIG. 1, a known image sensor may include a pixel array 1000, a column circuit 2000, and a low detector/pixel driver 3000.

The pixel array 1000 includes a plurality of image pixels 100 and may be arranged to have a mesh or grid form. The image pixels 100 may receive external light and output information regarding a received quantity of light as an electrical signal.

The column circuit 2000 may read information regarding the quantity of light stored in the image pixels 100 belonging to the same row of the pixel array 1000 and output a digital or analog signal.

The row detector/pixel driver 3000 may include a row detector detecting pixels for outputting information regarding the quantity of light and a pixel driver supplying power required for an operation of the image pixels 1000.

With such a configuration, information regarding the quantity of light stored in the image pixels 100 of a particular column and row can be obtained, and an image frame can be formed.

Here, in order to enhance resolution, the pixel array 1000 may include a considerably large number of image pixels. However, if the area occupied by the pixel array 1000 increases according to the increase in the number of image pixels 100, the overall image sensor would increase in size and have a difficulty in being applied to application devices. Also, in order to form an image on the pixel array, lenses must be changed and a focal length thereof must be secured.

Thus, it is preferable to increase integration of the image pixels 100 to dispose more image pixels 100 in the same area. In this case, however, a reduction in a dynamic range stemming from the reduction in the area of each image pixel 100, as mentioned above, remains to be solved.

A process of reducing a dynamic range will be described with reference to FIG. 8. When a certain quantity or more of light is irradiated to a light receiving unit 110 to generate photoelectrons in excess of a photoelectron accommodation capacity of the light receiving unit 110, the photoelectrons overpass a potential barrier of the light receiving unit 110 and the vicinity (or periphery) thereof, so as to be transferred to an element in the vicinity such as a substrate, or the like. In other words, photoelectrons generated by light having a certain intensity or more flow out, rather than being accommodated in the light receiving unit 110, and thus cannot be detected as an electrical signal.

Therefore, in the image pixels 100 and the image pixel control method according to an embodiment of the inventive concept, photoelectrons in excess of the photoelectron accommodation capacity of the light receiving unit 110 are transferred through a pre-set current path so as to be detected as an electrical signal, thus enhancing a dynamic range.

Figure 2:
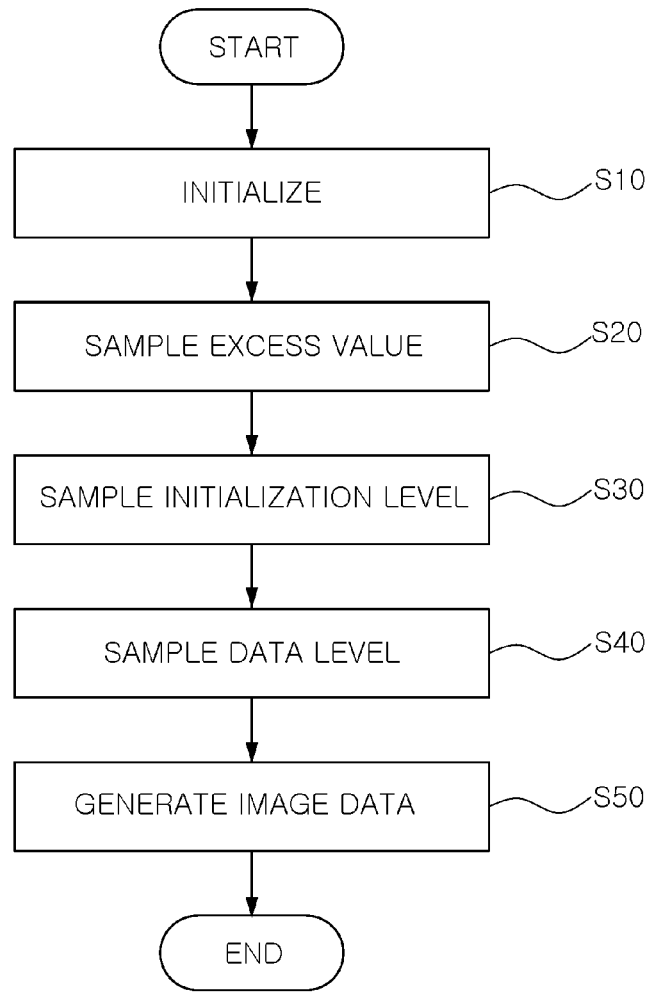
FIG. 2 is a flow chart illustrating a process of an image pixel control method according to an embodiment of the inventive concept.

FIG. 2 is a flow chart illustrating a process of an image pixel control method according to an embodiment of the inventive concept.

With reference to FIG. 2, the image pixel control method according to an embodiment of the inventive concept may include an initialization process (S10), an excess value sampling process (S20), an initialization level sampling process (S30), and a data level sampling process (S40), and may further include an image data generation process (S50).

In the initialization process (S10), the image pixel 100 may be reset to a state in which the image pixel is available to receive light and measure a quantity of light.

In the excess value sampling process (S20), when light in excess of the quantity of light sufficient to be sensed by the image pixel 100 is irradiated, information regarding the excess quantity of light may be measured.

In the initialization level sampling process (S30), the level of a reset voltage supplied to initialize the image pixel 100 may be measured.

In the data level sampling process (S40), information regarding the quantity of light measured within the sensing range (e.g., within a dynamic range) of the image pixel 100 may be measured.

In the image pixel control method according to an embodiment of the inventive concept performed through the foregoing processes, the image pixel 100 is initialized, and information regarding a quantity of light in excess of (or beyond) the sensing range (dynamic range) is measured, and thus enhancing a dynamic range of the image pixel 100.

Also, in the image data generation process (S50), information regarding the quantity of light irradiated to the image pixel 100 may be generated by using information regarding the quantity of light measured in the excess value sampling process (S20) and the data level sampling process (S40), as well as the information regarding the initialization state measured in the initialization level sampling process (S30).

Hereinafter, a process controlling the image pixel 100 by applying the foregoing image pixel control method to the image pixel 100 will be described.

Figure 3:
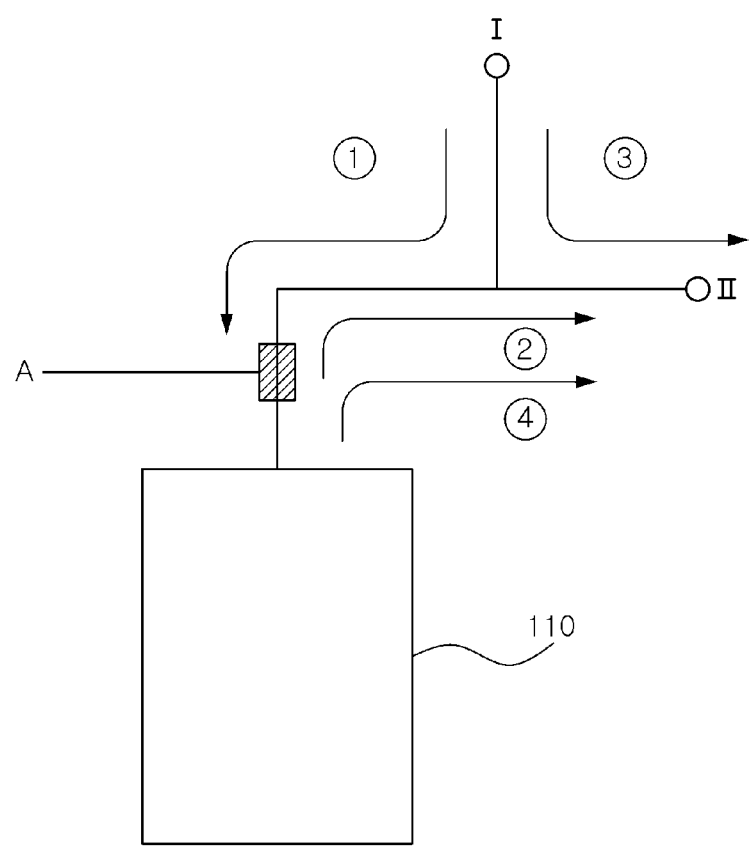
FIG. 3 is a view showing an example of an operational sequence when an image pixel control method according to an embodiment of the inventive concept is applied to an image pixel including a light receiving unit.

FIG. 3 is a view showing an example of an operational sequence when an image pixel control method according to an embodiment of the inventive concept is applied to an image pixel including a light receiving unit.

With reference to FIG. 3, the image pixel 100 to which the image pixel control method according to an embodiment of the inventive concept is applied may include the light receiving unit 110.

The light receiving unit 110, a device able to generate and accommodate photocharges by receiving light, generates information regarding a quantity of light, as an electrical signal and outputs the same.

According to operation ①, in the initialization process (S10), the light receiving unit 110 may be initialized. The initialization of the light receiving unit 110 is performed so as to minimize photoelectrons generated in a previous operation and reduce a generation of an image detection error. In the initialization process (S10), a voltage level for an initialization may be applied to the light receiving unit 110 through a port I for a certain period of time.

According to operation ②, in the excess value sampling process (S20), the voltage level corresponding to an amount of photoelectrons in excess of a photoelectron accommodation capacity of the light receiving unit 110 may be sampled through a port II. In particular, a current path A may be formed in order to allow photoelectrons, generated in excess of the photoelectron accommodation capacity of the light receiving unit 110, to be transferred to the port II. In general, the light receiving unit 110 is isolated from the vicinity due to a potential barrier or the like, so current path A may be controlled so as to have a voltage level lower than the level of the potential barrier to allow photoelectrons in excess of the photoelectron accommodation capacity of the light receiving unit 110 to move therethrough.

According to operation ③, in the initialization level sampling process (S30), a voltage level may be sampled when the light receiving unit 110 is initialized. The voltage level for initialization applied from the port I can be measured through the port II. Also, the current path A may be set such that the light receiving unit 110 is not connected with the port I while the initialization level sampling process (S30) is performed. This is because, when the voltage for initialization is applied to the light receiving unit 110, the photoelectrons accommodated in the light receiving unit 110 may be lost.

According to operation ④, in the data level sampling process (S40), the voltage level corresponding to the amount of photoelectrons accommodated in the light receiving unit 110 may be sampled through the port II. In particular, in the data level sampling process (S40), a voltage level dropped by the photoelectrons of the light receiving unit 110 may be sampled. Thus, in the data level sampling process (S40), the amount of photoelectrons may be estimated by measuring a change in voltage caused by the photoelectrons of the light receiving unit 110.

Although not shown, in the image data generation process (S50), image data may be generated by using the voltage level sampled in the excess value sampling process (S20), the voltage level sampled in the initialization level sampling process (S30), and the voltage level sampled in the data level sampling process (S40).

The quantity of light is estimated by using only the voltage level at the time of initialization and the voltage level according to the photoelectrons stored in the light receiving unit 110 after the photoelectrons are completely accommodated in the light receiving unit 110. In comparison, in the image pixel control method according to an embodiment of the inventive concept, when too many photoelectrons are generated, the excess amount of photoelectrons are moved by using a particular current path so as to be sampled, thus preserving data, and information regarding the quantity of irradiated light can be recovered by using the preserved data. Therefore, in the image pixel control method according to an embodiment of the inventive concept, in order to enhance the dynamic range of the image pixel 100, data in excess of the existing dynamic range is separately read and corrected later. Accordingly, in the image pixel control method according to an embodiment of the inventive concept, the dynamic range can be enhanced even for the same image pixel 100.

Figure 4:
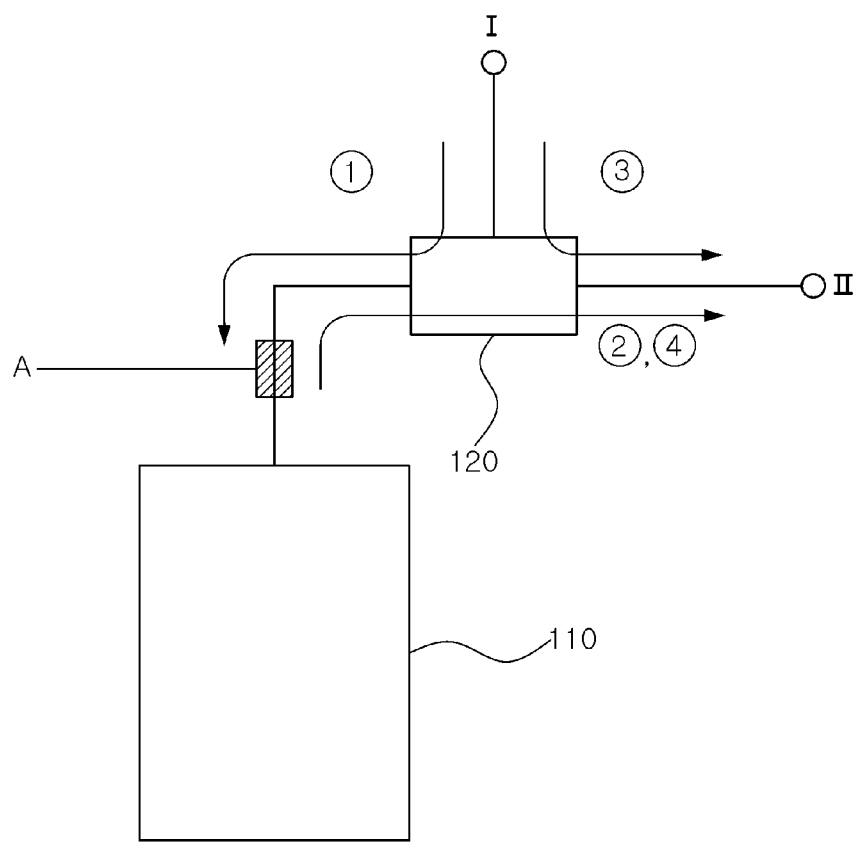
FIG. 4 is a view showing an example of an operational sequence when the image pixel control method according to an embodiment of the inventive concept is applied to an image pixel including a light receiving unit and a buffer unit.

FIG. 4 is a view showing an example of an operational sequence when the image pixel control method according to an embodiment of the inventive concept is applied to an image pixel including a light receiving unit and a buffer unit.

With reference to FIG. 4, the image pixel 100 to which the image pixel control method according to an embodiment of the inventive concept is applied may include the light receiving unit 110 and a buffer unit 120.

The light receiving unit 110, a device able to generate and accommodate photocharges by receiving light, generates information regarding a quantity of light, as an electrical signal and outputs the same, and the buffer unit 120 may accommodate charges and make a current path. The use of the buffer unit 120 can enhance independency of the port I and the port II.

According to operation ①, in the initialization process (S10), the buffer unit 120 and the light receiving unit 110 are electrically connected and an initialization voltage level is applied to the buffer unit 120 through the port I to initialize the light receiving unit 110. Since the buffer unit 120 and the light receiving unit 110 are electrically connected, the light receiving unit 110 may also have the initialization voltage level applied through the port I.

According to operation ②, in the excess value sampling process (S20), the buffer unit 120 and the light receiving unit 110 are electrically connected by a current path A having a pre-set level of conductivity to transfer an amount of photoelectrons in excess of a photoelectron accommodation capacity of the light receiving unit 110, and a voltage level of the buffer unit 120 may be sampled through the port II. Therefore, photoelectrons in excess of the photoelectron accommodation capacity of the light receiving unit 110 are transferred to and stored in the buffer unit 120, and the amount of photoelectrons transferred to the buffer unit 120 may be measured as the voltage level. In particular, since the buffer unit 120 has the initialization voltage level obtained through the initialization process (S10), the amount of photoelectrons may be determined by measuring the voltage level changed by the introduced photoelectrons. In particular, the current path A may have a potential barrier having a level allowing the photoelectrons in excess of the photoelectron accommodation capacity of the light receiving unit 110 to be transferred to the buffer unit 120. In addition, the level of the potential barrier is lower than that of potential barrier isolating the light receiving unit 110 from the vicinity (or periphery) to make the photoelectrons in excess of the photoelectron accommodation capacity of the light receiving unit 110 move through the current path.

According to operation ③, in the initialization level sampling process (S30), the initialization voltage level is applied to the buffer unit 120 through the port I so that the initialization voltage level can be sampled through the port II. In the initialization level sampling process (S30), the buffer unit 120 is reset by using the initialization voltage level to reduce the effect of the photoelectrons accommodated in the excess value sampling process (S20) and information regarding an initial state of the buffer unit 120 and the light receiving unit 110 can be measured. Here, the current path A may be closed to allow the light receiving unit 110 and the buffer unit 120 to be independent, or it may be set such that a flow of electrons through the current path A may move, for example, only from the light receiving unit 110 to the buffer unit 120.

According to operation ④, in the data level sampling process (S40), the buffer unit 120 and the light receiving unit 110 are electrically connected to allow the buffer unit 120 and the light receiving unit 110 to share the photoelectrons accommodated in the light receiving unit 110, and the voltage level of the buffer unit 120 may be sampled through the port II. Therefore, the light receiving unit 110 and the buffer unit 120 are electrically connected to allow the light receiving unit 110 and the buffer unit 120 to have the same voltage level, and the voltage level of the buffer unit 120 may be measured so as to estimate the amount of photoelectrons accommodated in the light receiving unit 110 and thus estimate the quantity of light.

Although not shown, in the image data generation process (S50), image data may be generated by using the voltage level sampled in the excess value sampling process (S20), the voltage level sampled in the initialization level sampling process (S30), and the voltage level sampled in the data level sampling process (S40).

Figure 5:
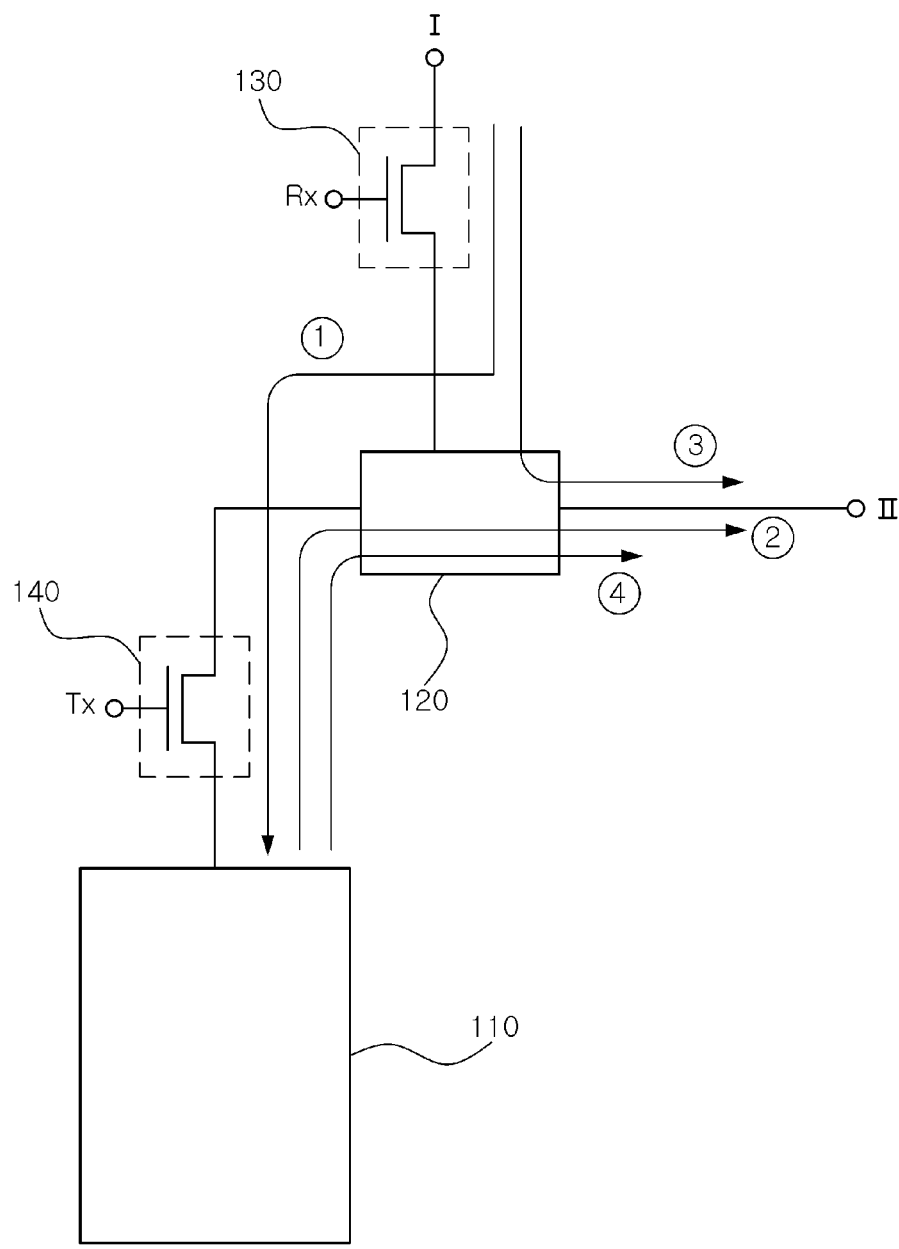
FIG. 5 is a view showing an example of an operational sequence when the image pixel control method according to an embodiment of the inventive concept is applied to an image pixel including a light receiving unit, a buffer unit, a first transistor Tx, and a second transistor Rx.

FIG. 5 is a view showing an example of an operational sequence in which the image pixel control method according to an embodiment of the inventive concept is applied to an image pixel including a light receiving unit, a buffer unit, a first transistor Tx, and a second transistor Rx.

With reference to FIG. 5, the image pixel 100 to which the image pixel control method according to an embodiment of the inventive concept is applied may include the light receiving unit 110, the buffer unit 120, a first transistor 140, and a second transistor 130.

The light receiving unit 110 is able to generate and accommodate photocharges by receiving light, generates and outputs information regarding a quantity of light as an electrical signal. Also, the buffer unit 120 may accommodate charges and determine a current path. The first transistor 140 electrically connects the buffer unit 120 and the light receiving unit 110, and the second transistor 130 may electrically connect the buffer unit 120 and the power source I providing an initialization voltage. The use of the first transistor 140 and the second transistor 130 can enhance independency of the light receiving unit 110, the buffer unit 120, the port I, and port II. The first transistor 140 and the second transistor 130 can control a flow of a current according to a gate voltage, performing an operation similar to that of a switch.

According to operation ①, in the initialization process (S10), the second transistor 140 may be turned on so as to electrically connect the buffer unit 120, the light receiving unit 110 and the power source I and initialize the light receiving unit 110 and the buffer unit 120 with an initialization voltage level.

According to operation ②, in the excess value sampling process (S20), the second transistor 130 may be turned off and a gate voltage of the first transistor 140 is maintained at a pre-set level, so as to transfer photoelectrons in excess of a photoelectron accommodation capacity of the light receiving unit 110 to the buffer unit 120, and the voltage level of the buffer unit 120 may be sampled. Also, the pre-set level of the first transistor may be equal to or higher than a threshold voltage of the first transistor 140. This is because, if the pre-set level of the gate voltage of the first transistor 140 is lower than the threshold voltage, the amount of electrons transferred through a current path would be extremely small. Here, the pre-set level of the gate voltage of the first transistor 140 may be within a range in which photoelectrons are only transferred only from the light receiving unit 110 to the buffer unit 120. In other words, the pre-set level of the gate voltage of the first transistor 140 may be set to form a unidirectional current path.

According to operation ③, in the initialization level sampling process (S30), the second transistor 130 may be turned on and a voltage level of the buffer unit 120 may be sampled.

According to operation ④, in the data level sampling process (S40), the first transistor 130 may be turned off and the second transistor 140 may be turned on so as to allow the photoelectrons of the light receiving unit 110 to be shared by the buffer unit 120, and the voltage level of the buffer unit 120 may be sampled.

Although not shown, in the image data generation process (S50), image data may be generated by using the voltage level sampled in the excess value sampling process (S20), the voltage level sampled in the initialization level sampling process (S30), and the voltage level sampled in the data level sampling process (S40).

Here, in the image data generation process (S50), a voltage variation due to the excess amount of photoelectrons is a value obtained by subtracting the voltage level Vovr sampled in the excess value sampling process (S20) from the voltage level Vrst sampled in the initialization level sampling process (S30), and a voltage generation by the photoelectrons accommodated in the light receiving unit 110 is a value obtained by subtracting a voltage level Vsig sampled in the data level sampling process (S40) from a voltage level Vrst sampled in the initialization level sampling process (S30). Thus, when the light receiving unit 110 which has secured a sufficient dynamic range is used, the voltage variation Vimg generated by the entire quantity of light is 2*Vrst−Vovr−Vsig.

Figure 6:
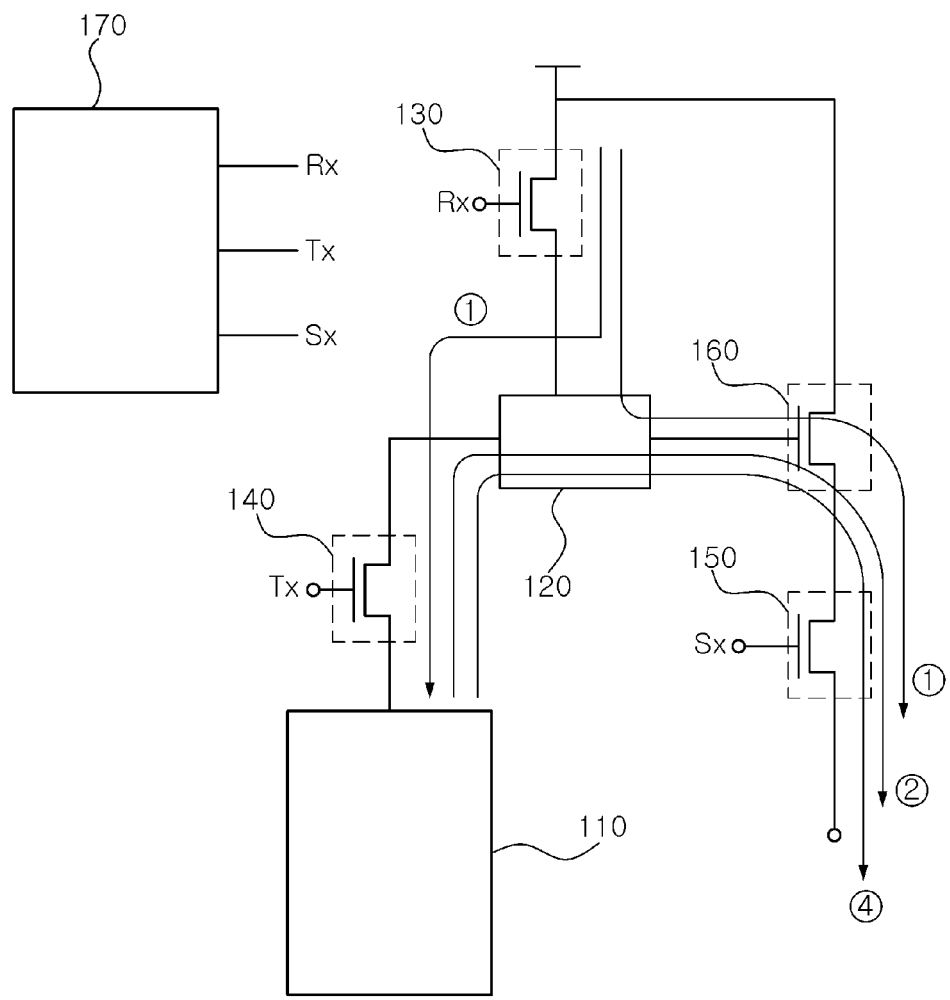
FIG. 6 is a schematic view showing the configuration of an image pixel according to an embodiment of the inventive concept.

FIG. 6 is a schematic view showing the configuration of an image pixel, according to an embodiment of the inventive concept, including a light receiving unit, a buffer unit, a first transistor Tx, a second transistor Rx, and a third transistor Sx.

With reference to FIG. 6, the image pixel 100 to which the image pixel control method according to an embodiment of the inventive concept is applied may include the light receiving unit 110, the buffer unit 120, the first transistor 140, the second transistor 130, the third transistor 150, and a controller 170.

The light receiving unit 110, the buffer unit 120, the second transistor 130, and the first transistor 140 have been described, so a description thereof here is omitted hereinafter.

The third transistor 150 may control a electrical connection between the buffer unit 120 and an external device according to a voltage applied to a gate thereof.

The use of the second transistor 130, the first transistor 140, and the third transistor 150 can enhance independency of the light receiving unit 110, the buffer unit 120, and an external device.

The controller 170 may control ON/OFF operations of the respective transistors by adjusting a voltage level applied to the gates of the second transistor 130, the first transistor 140, and the third transistor 150. In other words, the controller 170 may adjust the levels of the gate voltages to control a current to flow, thus controlling an operation of the image pixel 100.

The controller 170 may turn the second transistor 130 and the first transistor 140 on so as to initialize the light receiving unit 110, apply a pre-set voltage level to the gate of the first transistor 140 to transfer photoelectrons in excess of the photoelectron accommodation capacity of the light receiving unit 110 to the buffer unit 120, and turn the third transistor 150 on to output voltage level information of the buffer unit 120 to an external device. Also, the controller 170 may turn the second transistor 130 and the third transistor 150 on so as to output the voltage level information of the buffer unit 120 to the external device, turn the first transistor 140 on so as to allow photoelectrons accommodated in the light receiving unit 110 to be shared by the buffer unit 120, and turn the third transistor 150 on so as to output the voltage level information of the buffer unit 120 to the external device.

In particular, the pre-set voltage level applied to the gate of the first transistor 140 may be equal to or higher than a threshold voltage level of the first transistor 140. Here, the pre-set voltage level applied to the gate of the first transistor 140 may be controlled within a range in which photoelectrons are only transferred to the buffer unit 120 from the light receiving unit 110.

Also, if the area of the image pixel 110 is reduced, the quantity of light irradiated to the light receiving unit 110 would be reduced and the amount of accommodated photoelectrons would also be reduced. Then, the voltage level of the buffer unit 120 would be very slightly changed, making it difficult to capture information regarding the quantity of light. Thus, the image pixel 100 may further include a transistor 160 for amplifying the voltage level of the buffer unit 120 and transferring the same to the third transistor 150. In this case, the transistor 160 may operate like a transistor amplifier.

Figure 7A:
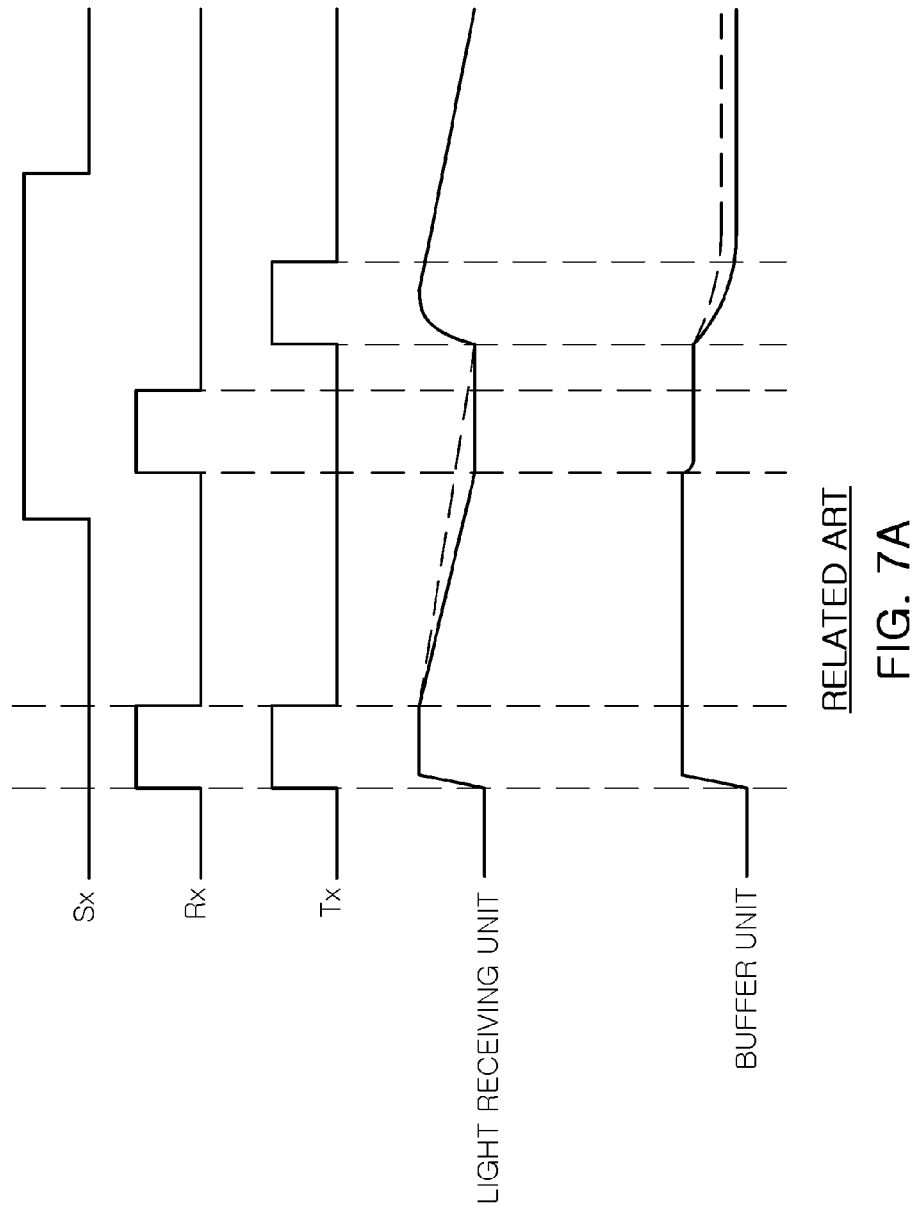
FIG. 7A is a view showing changes in voltages of respective parts of an image pixel with the lapse of time, when the related art image pixel control method is applied.

FIG. 7A is a view showing changes in voltages of respective parts of an image pixel with the lapse of time, when the related art image pixel control method is applied, and FIG. 7B is a view showing changes in voltages of respective parts of an image pixel with the lapse of time, when the image pixel control method according to an embodiment of the inventive concept is applied.

With reference to FIG. 7A, if a gate voltage of the first transistor 140 is maintained to be low level so that the first transistor 140 can be turned off after the initialization process (S10). Thus, the light receiving unit (photodiode) 110 operates independently. Photoelectrons generated in excess of the photoelectron accommodation capacity of the light receiving unit 110 due to an excessive quantity of irradiated light (solid line) move to the vicinity of the light receiving unit (substrate, or the like), so the voltage level of the light receiving unit 110 is not changed any further.

With reference to FIG. 7B, in the image pixel control method according to an embodiment of the inventive concept, a voltage level previously set not to completely turn off the first transistor 140 is applied to the gate of the first transistor 140 after the initialization process (S10). Thus, the light receiving unit 110 may interwork with the buffer unit 120. In particular, when the quantity of light irradiated to the light receiving unit 110, the light receiving unit 110 may operate as shown in FIG. 7A (dotted line). However, when photoelectrons in excess of the photoelectron accommodation capacity of the light receiving unit 110 are generated due to an excessive quantity of irradiated light, the photoelectrons may be transferred to the buffer unit 120.

Therefore, in the image pixel control method according to an embodiment of the inventive concept, the photoelectrons in excess of the photoelectron accommodation capacity of the light receiving unit 110 can be transferred to the buffer unit 120 to make information.

Figure 8:
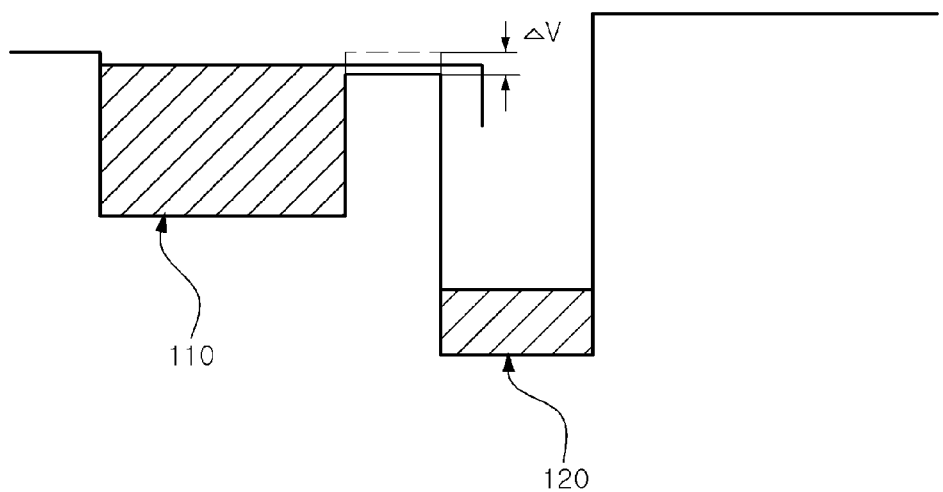
FIG. 8 is a view schematizing a state of setting a gate voltage level of the first transistor Tx of the image pixel and the image pixel control method according to an embodiment of the inventive concept.

FIG. 8 is a view schematizing a state of setting a gate voltage level of the first transistor of the image pixel and the image pixel control method according to an embodiment of the inventive concept.

With reference to FIG. 8, the level of a potential barrier isolating the light receiving unit 110 and the buffer unit 120 may be determined according to a gate voltage of the first transistor in an embodiment of the inventive concept.

In the image pixel control method according to an embodiment of the inventive concept, in the excess value sampling process (S20), unlike the related art control method, the gate voltage of the first transistor 140 is maintained at a pre-set value so that the level of the potential barrier isolating the light receiving unit 110 and the buffer unit 120 is lower than that of a potential barrier of other portions encompassing the light receiving unit 110 by a predetermined value ($\Delta V$). Accordingly, photoelectrons in excess of the photoelectron accommodation capacity of the light receiving unit 110 can be mostly transferred to the buffer unit 120. In particular, in order to allow the photoelectrons of the light receiving unit 110 to move to the buffer unit 120, the gate voltage of the first transistor 140 may be controlled to be equal to or higher than the threshold voltage of the first transistor 140, and the gate voltage of the first transistor 140 may be set to be within a voltage range in which a current flows only from the light receiving unit 110 to the buffer unit 120.

Figure 9:
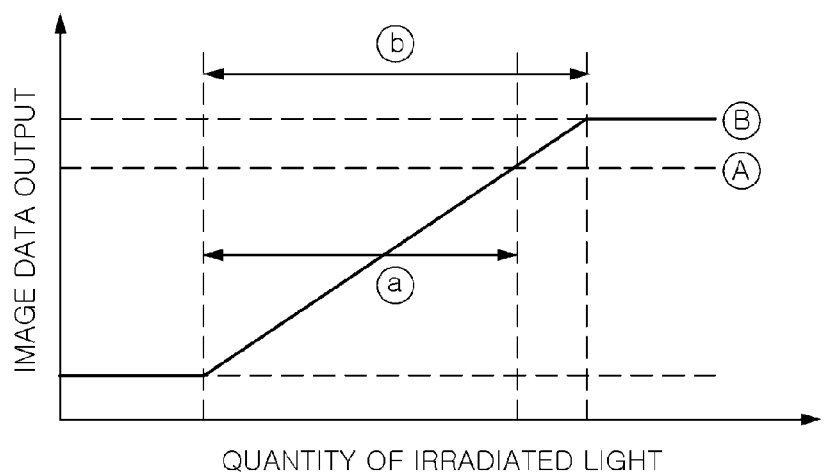
FIG. 9 is a graph showing the degree of enhancement of a dynamic range when the image pixel and the image pixel control method according to an embodiment of the inventive concept is applied.

FIG. 9 is a graph showing the degree of enhancement of a dynamic range when the image pixel and the image pixel control method according to an embodiment of the inventive concept is applied.

If the quantity (a) of irradiated light exceeds a certain value, photoelectrons are leaked to the substrate, making it impossible to measure a change in voltage any further, so there is no change in an image data output (A). Thus, the dynamic range (a) of the pixel 100 is up to the range in which the photoelectrons are not leaked to the substrate.

However, if the image pixel 100 and the control method according to an embodiment of the inventive concept are employed, although the quantity (b) of irradiated light exceeds the certain value, the photoelectrons move to the buffer unit 120 so as to be extracted as information, a change in the image data output (B) with respect to a larger quantity of irradiated light can be sensed. Thus, the dynamic range (b) of the image pixel 100 can be enhanced.

The degree of enhancement of the dynamic range of the image pixel 100 may be determined according to a duration for which the excess value sampling process (S20) is performed, the photoelectron accommodation capacity of the buffer unit 120, the voltage applied to the gate of the first transistor 140, and the like.

As set forth above, according to embodiments of the inventive concept, the range of quantity of light that can be sensed (or detected) by the image pixel can be enhanced.

While the inventive concept has been shown and described in connection with the embodiments, it will be apparent to those skilled in the art that modifications and variations can be made without departing from the spirit and scope of the invention as defined by the appended claims.

What is claimed is:

1. A method of controlling an image pixel including a light receiving unit configured to generate photocharges through receiving light and accommodate the generated photocharges, a buffer unit configured to accommodate the photocharges, a first transistor configured to electrically connect the light receiving unit and the buffer unit and a second transistor configured to electrically connect the buffer unit and a power source supplying an initialization voltage, comprising:

performing an initialization process comprising initializing the light receiving unit by applying the initialization voltage to the light receiving unit;

performing an excess value sampling process comprising sampling a voltage level corresponding to a quantity of photoelectrons in excess of a photoelectron accommodation capacity of the light receiving unit;

performing an initialization level sampling process comprising applying the initialization voltage to the buffer unit and sampling the initialization voltage of the buffer unit and performing a data level sampling process comprising distributing the photoelectrons accommodated in the light receiving unit to the buffer unit and sampling the voltage level of the buffer unit, wherein in the excess value sampling process, the second transistor is turned off, a gate voltage of the first transistor is maintained at a pre-set level to transfer the photoelectrons in excess of a photoelectron accommodation capacity of the light receiving unit to the buffer unit, and a voltage level of the buffer unit is sampled, wherein the pre-set level of the gate voltage of the first transistor in the excess value sampling process is equal to or higher than a threshold voltage of the first transistor, and wherein in the data level sampling process, the second transistor is turned off, and the first transistor is turned on to allow the photoelectrons of the light receiving unit to be shared by the buffer unit, and the voltage level of the buffer unit is sampled.

2. The method of claim 1, wherein, in the initialization process, a voltage level for initialization is applied to the light receiving unit during a certain period of time.

3. The method of claim 1, wherein, in the initialization level sampling process, the voltage level for initialization is sampled in a state of making the light receiving unit independent.

4. The method of claim 1, wherein, in the data level sampling process, a voltage level dropped by the photoelectrons accommodated in the light receiving unit is sampled from the voltage level at the time of initialization.

5. The method of claim 1, wherein, in the excess value sampling process, photoelectrons in excess of the photoelectron accommodation capacity of the light receiving unit are transferred through a pre-set current path.

6. The method of claim 1, further comprising an image data generation process generating an image data by using the voltage level sampled in the excess value sampling process, the voltage level sampled in the initialization level sampling process, and the voltage level sampled in the data level sampling process.

7. The method of claim 1, wherein in the excess value sampling process, the buffer unit and the light receiving unit are electrically connected by a current path having a pre-set level of conductivity, and the current path has a potential barrier having a level allowing the photoelectrons in excess of a photoelectron accommodation capacity of the light receiving unit to be transferred to the buffer unit.

8. The method of claim 7, wherein the level of the potential barrier is lower than the level of a potential barrier isolating the light receiving unit from the vicinity.

9. The method of claim 1, further comprising an image data generation process generating an image data by using the voltage level sampled in the excess value sampling process, the voltage level sampled in the initialization level sampling process, and the voltage level sampled in the data level sampling process.

10. The method of claim 1, wherein
in the initialization process, the second transistor and the first transistor is turned on to electrically connect the buffer unit, the light receiving unit and the power source, and the light receiving unit and the buffer unit are initialized with an initialization voltage level; and in the initialization level sampling process, the second transistor is turned on and the voltage level of the buffer unit is sampled.

11. The method of claim 10, further comprising an image data generation process generating an image data by using the voltage level sampled in the excess value sampling process, the voltage level sampled in the initialization level sampling process, and the voltage level sampled in the data level sampling process.

12. The method of claim 1, wherein the pre-set level of the gate voltage of the first transistor in the excess value sampling process is within a range in which the photoelectrons are transferred to the buffer unit from the light receiving unit.

13. An image pixel comprising:
a light receiving unit configured to generate photocharges by receiving light, and accommodate the generated photocharges;
a buffer unit configured to accommodate charges;
a first transistor configured to electrically connect the light receiving unit and the buffer unit;
a second transistor configured to electrically connect the buffer unit and a power source;
a third transistor configured to electrically connect the buffer unit and an external device; and
a controller configured to control an ON/OFF operation of the respective transistors by adjusting a voltage level applied to the gates of the first, second, and third transistors,
wherein the controller turns the second transistor and the first transistor on to initialize the light receiving unit, applies a pre-set voltage level to the gate of the first transistor to transfer photoelectrons in excess of a photoelectron accommodation capacity of the light receiving unit to the buffer unit, turns the third transistor on to output voltage level information of the buffer unit to an external device, turns the second transistor and the third transistor on to output the voltage level information of the buffer unit to the external device, turns the first transistor on to allow the photoelectrons accommodated in the light receiving unit to be shared by the buffer unit, and turns the third transistor on to output the voltage level information of the buffer unit to the external device, and wherein the pre-set voltage level applied to the gate of the first transistor is equal to or higher than a threshold voltage level of the first transistor.

14. The image pixel of claim 13, wherein the pre-set voltage level applied to the gate of the first transistor is within a range in which the photoelectrons are transferred only to the buffer unit from the light receiving unit.

15. The image pixel of claim 13, further comprising a transistor amplifying the voltage level of the buffer unit and transferring the same to the third transistor.

* * * * *